United States Patent [19]

Miyoshi

[11] Patent Number: 4,891,780
[45] Date of Patent: Jan. 2, 1990

[54] DIVISIONAL OPERATION SYSTEM FOR OBTAINING A QUOTIENT BY REPEATED SUBTRACTION AND SHIFT OPERATIONS

[75] Inventor: Akio Miyoshi, Ome, Japan

[73] Assignee: Kabushiki Kaisha Toshiba, Kawasaki, Japan

[21] Appl. No.: 167,173

[22] Filed: Mar. 11, 1988

[30] Foreign Application Priority Data

Mar. 31, 1987 [JP] Japan ................................ 62-79158

[51] Int. Cl.⁴ .............................................. G06F 7/52
[52] U.S. Cl. ..................................... 364/766; 364/745
[58] Field of Search ................................ 364/766, 745

[56] References Cited

U.S. PATENT DOCUMENTS 4,466,077 8/1984 Iannucci et al. .................... 364/766
4,692,891 9/1987 Yamaoka et al. ................... 364/766

OTHER PUBLICATIONS

Sanyal, "An Algorithm for Non-restoring Division" *Computer Design* May 1977, pp. 124–127.
Lemaire et al, "Improved Non-Restoring Division", *IBM Tech. Disclosure Bulletin*, vol. 23, No. 3, Aug. 1980, pp. 1149–1151.
Gerberich et al, "Multiplier/Divider Hardware Design Accelerates Microprocessor Throughput" *Computer Design* Jun. 1979, pp. 105–112.

*Primary Examiner*—David H. Malzahn
*Attorney, Agent, or Firm*—Foley & Lardner, Schwartz, Jeffery, Schwaab, Mack, Blumenthal & Evans

[57] ABSTRACT

A divisional operation is performed by the invention, using three registers. The higher order digits or figures of dividend are given to the first register and the lower order digits or figures thereof are given to the second register. In addition, a divisor is given to the third register. Subtraction is performed between the content of the first register and the content of the third register. On the basis of the sign of the result, the quotient is determined. Every time subtraction is performed, a shift operation is conducted in the first and second registers. The quotient is stored in the second register from the least significant bit thereof. In such a shift operation, data of 1 bit is transferred from the most significant bit of the second register to the least significant bit of the first register. Where the data of 1 bit thus transferred represents "1" when the operation is completed, it is detected that division is in an overflow state.

4 Claims, 4 Drawing Sheets

FIG. I PRIOR ART

DIVISIONAL OPERATION SYSTEM FOR OBTAINING A QUOTIENT BY REPEATED SUBTRACTION AND SHIFT OPERATIONS

BACKGROUND OF THE INVENTION

This invention relates to a divisional operation system, and more particularly to a divisional operation system to obtain a quotient by repeating subtraction and shift operations.

In a divisional operation system, a register for storing dividends therein, a register for storing divisors therein, and a register for storing quotients therein are provided. Generally, a portion of the register for storing dividend therein is common to the register for storing quotients therein. Division is executed by repeatedly performing a first operation to subtract a divisor from higher order digits or figures of dividends and a second operation to shift the dividend to the left after the first operation is completed, to carry out the next subtraction. The quotient is obtained by representing signs or symbols of respective subtraction results with 1 and 0 to arrange them in succession.

When the dividend is considerably larger than the divisor, the quotient obtained as a result of division also becomes large, so the number of figures or digits of the register for storing the quotient becomes insufficient. Namely, the division will overflow, thus failing to obtain a correct operation result. For this reason, with the conventional divisional operation system, prior to the execution of an actual divisional operation, a comparative operation between the dividend and the divisor is performed to judge whether or not the division overflows.

As described above, since the comparative operation for examining whether or not the division overflows is carried out prior to all divisional operations in the conventional divisional operation system, there has occurred the problem that it takes an extra or excessive time, resulting in slow operation speed.

SUMMARY OF THE INVENTION

An object of this invention is to provide a divisional operation system which has saved an extra operation to attain a high operation speed.

To achieve the above object, this invention provides a divisional operation system comprising a first register for storing higher order digits or figures of dividend, a second register for storing lower order digits or figures of the dividend, a third register for storing divisors, an ALU (Arithmetic and Logic Unit) for performing subtraction between the contents of the first register and the content of the third register or addition of both the contents, a divisional result generation circuit indicating that the operation result of the ALU has been negative, and an ALU function select circuit for allowing the ALU to perform addition only when the divisional result generation circuit indicates a negative state, wherein after the ALU has completed one operation, the operation result is shifted to the left by one bit to store it into the first register and the content of the second register is shifted to the left by one bit to store the most significant bit thereof into the least significant bit of the first register, and wherein when the divisional result generation circuit indicates a negative state, "0" is stored into the least significant bit of the second register, and when otherwise, "1" is stored thereinto, thus to perform a next operation, thereafter to repeatedly perform operations a necessary number of times until a quotient is obtained at the second register, characterized in that there is further provided an overflow indication circuit for holding a bit shifted from the most significant bit of the second register after the necessary number of operations have been completed to indicate that the division is in an overflow state when the last-mentioned bit represents "1".

With the divisional operation system according to this invention, whether or not the division is in an overflow state is judged by a bit shifted from the most significant bit of the second register after necessary number of operations have been completed. Namely, when this bit represents "1", it is indicated that the division is in an overflow state. This bit is generated at a divisional result generation circuit by the operation result when the first subtraction is conducted. The fact that this bit represents "1" indicates that the result of the first subtraction has been positive. Namely, this indicates that the content of the first register is larger than the content of the third register or is equal thereto at the first time. As just described above, since whether or not the division is in an overflow state can be judged at the end of the divisional operation, the necessity of performing a comparative operation prior to the divisional operation as required with the conventional operation system is eliminated, thus to eliminate an extra operation, making it possible to improve the operation speed.

DESCRIPTION OF THE PREFERRED EMBODIMENT

This invention will be described in connection with a preferred embodiment shown. The divisional operation system according to this invention is characterized in that an overflow indication circuit is newly provided in the conventional divisional operation system. For convenience of explanation, the configuration of a conventional divisional operation system and the operation thereof will be first described for reference.

Figure 1:
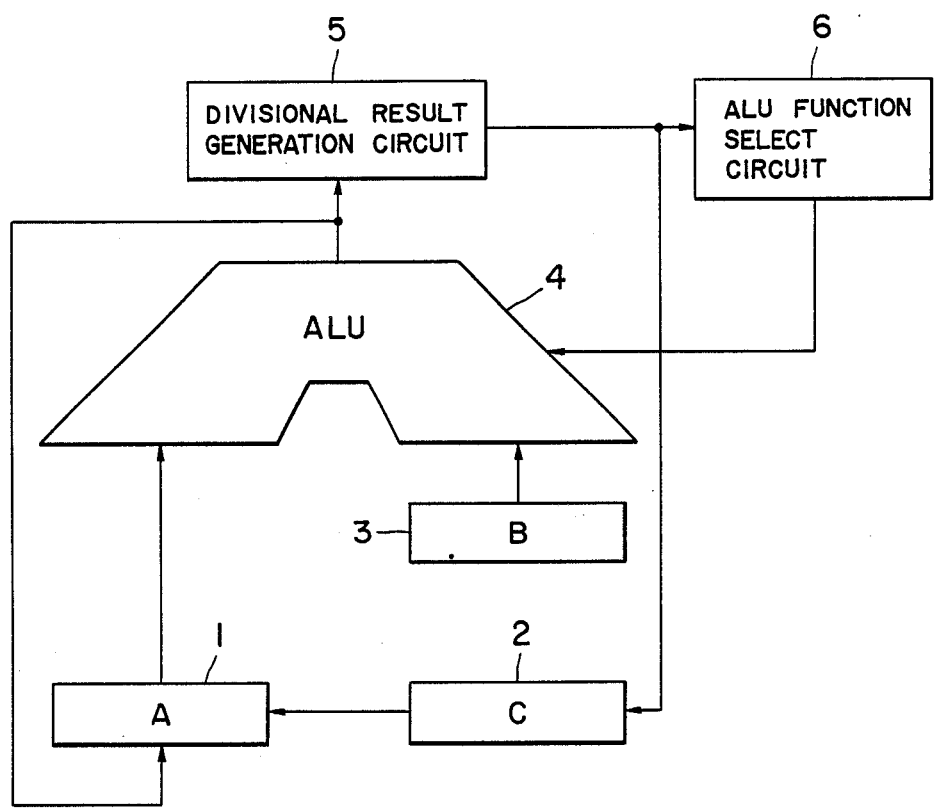
FIG. 1 is a block diagram showing a conventional divisional operation system.

FIG. 1 is a block diagram of a conventional divisional operation system. This system includes first to third registers 1 to 3. Each register can hold, e.g., data of 8 bits. The higher order digits or figures of dividend and the lower order digits or figures thereof are stored into the first register 1 and the second register 2, respectively. Further, the quotient is stored in the third register 3. The quotient, as the result of divisional operation, is obtained eventually at the second register 2. Accordingly, in this example, an operation to divide a dividend of up to 16 bits by a divisor of up to 8 bits can be performed. When the quotient obtained as a result of this operation exceeds 8 bits, the divisional operation overflows. For brevity of explanation, the contents of the first to third registers 1 to 3 will be referred to as data A, C and B.

An arithmetic and logic unit (ALU) 4 is a circuit to perform various operations between data A and B. In this example, comparative operation between both data is performed in addition to subtraction and addition thereof. The results of subtraction and addition are fed back to the first register 1 for a second time. At this time, each result is fed back to the register 1 after shifted to the left by one bit as described later. A divisional result generation circuit 5 outputs "0" or "1" by the operation having been performed at the ALU 4. Namely, when the operation result is negative, "0" is outputted, otherwise, a "1" is outputted. Such an output is stored into the least significant bit of the second register 2. At this time, data C, having been stored in the second register 2, is to be shifted to the left by one bit and the most significant bit of the data C is to be stored into the least significant bit of the first register 1. An ALU function select circuit 6 is a circuit to designate the operation that the ALU 4 performs during the divisional operation as subtraction or addition. This circuit 6 has a function to designate the next operation of the ALU 4 as addition when "0" is given from the divisional result generation circuit 5, and to designate the same as subtraction when "1" is given therefrom.

Figure 2:
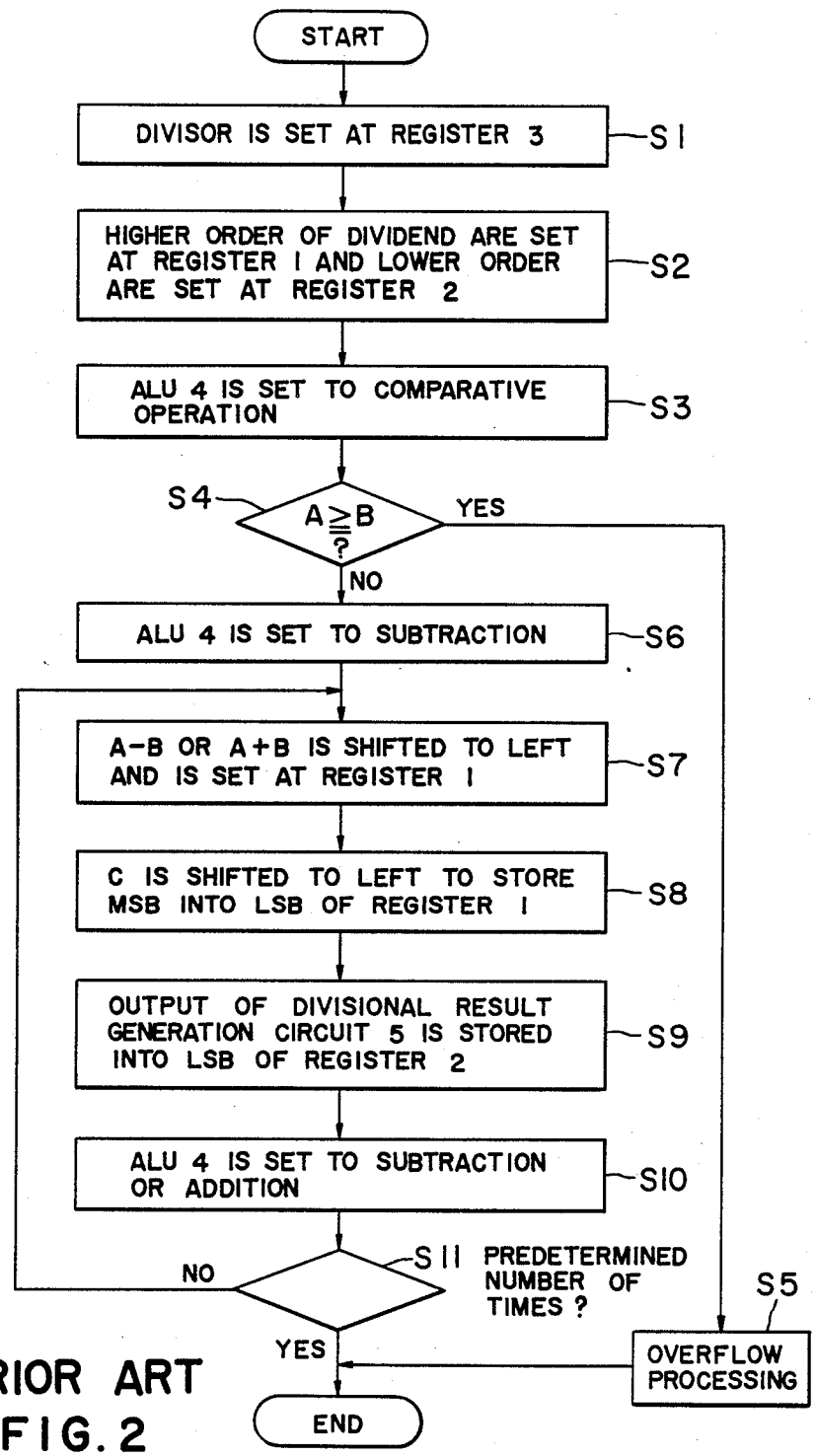
FIG. 2 is a flowchart for explaining the operation of the system shown in FIG. 1.

The procedure for division by this system will be explained with reference to the flowchart shown in FIG. 2. Initially, at step S1, the divisor is set at the register 3 as data B. Subsequently, at step S2, the higher order digits or figures of the dividend are set at the register 1 as data A and the lower order digits or figures thereof are set at the register 2 as data C. Then, at step S3, the operational mode of the ALU 4 is set to the comparative operation. Thus, at step S4, the comparative operation between the data A and C is performed. In this example, when $A \geq B$, the overflow processing is executed at step S5 where no division is performed. This is because the relationship of $A \geq B$ indicates that the higher order digits or figures of the dividend are larger than the divisor and hence the number of digits or figures of the quotient is too great, with the result that they cannot be stored in the second register 2.

At step S4, only when $A < B$, the division described below will be carried out. First, at step S6, the operational mode of the ALU 4 is set to subtraction. Accordingly, at step S7, the subtraction expressed as A-B is conducted. The data obtained as a result of this operation is shifted to the left by one bit and then stored into the first register 1. Then, at step S8, the data C in the second register 2 is shifted to the left by one bit. At this time, the most significant bit of the data C which has overflowed from the second register 2 is to be stored into the least significant bit of the first register 1. Further, at step S9, the output of the divisional result generation circuit 5 is stored into the least significant bit of the second register 2. As previously described, the divisional result generation circuit 5 generates "0" when the operation result in the ALU 4 is negative, and "1" when otherwise. Eventually, the bit train produced by the divisional result generation circuit 5 becomes a quotient. In addition, at step S10, the ALU function select circuit 6 sets the operation performed next time at the ALU 4 as subtraction or addition on the basis of the output of the divisional result generation circuit 5. Namely, the circuit 6 sets the addition when the divisional result generation circuit 5 is outputting "0" and the subtraction when it is outputting "1".

The procedures from the step S7 up to the step S10 as described above are repeated by a predetermined number of times, i.e., the number of times expressed as the number of bits of the second register 2 plus 1. It is to be noted that the operation set at the step S10 is to be performed at the step S7. When a predetermined number of repetitions are completed in this way, all the divisional procedures are completed via the step S11. The quotient to be obtained has been obtained at the second register 2.

Figure 3:
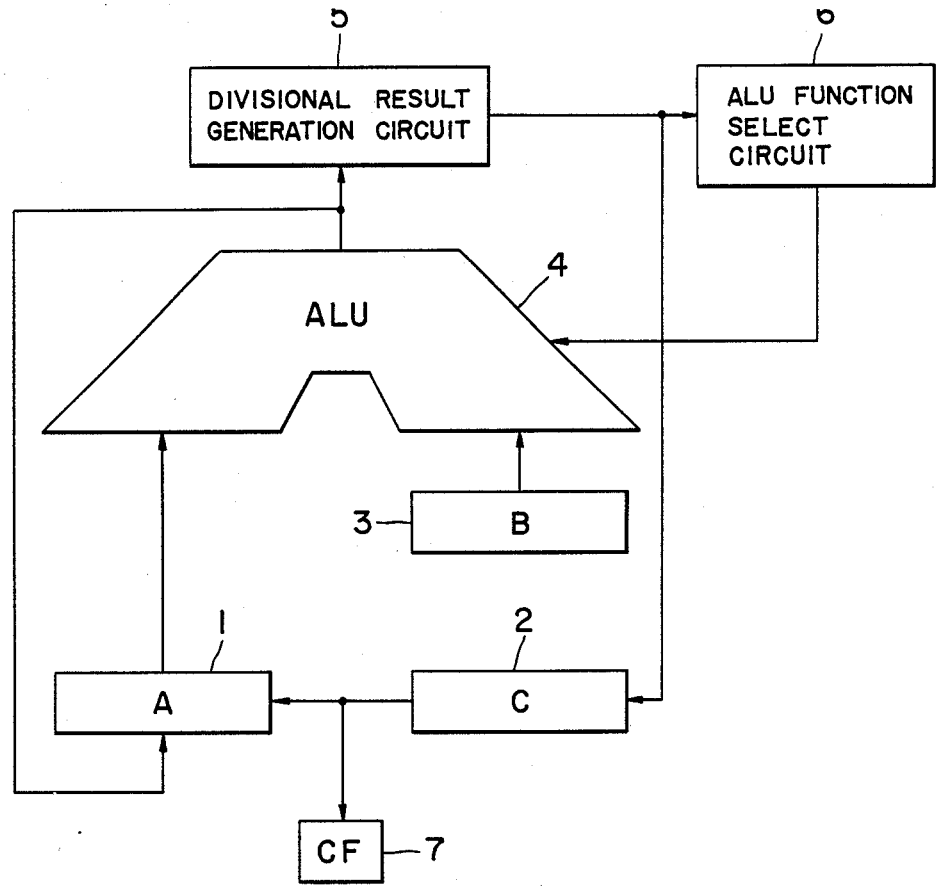
FIG. 3 is a block diagram showing an embodiment of a divisional operation system according to this invention.

Turning to FIG. 3, there is shown in block form an embodiment of a divisional operation system according to this invention. This system is characterized in that an overflow indication circuit 7 is further provided in the conventional system shown in FIG. 1. In this embodiment, the overflow indication circuit 7 indicates a carry flag of data C in the second register 2. Accordingly, the original most significant bit when data C in the second register 2 is shifted to the left will be stored into the most significant bit of the first register 1 and will be also held as a carry flag in the overflow indication circuit 7.

Figure 4:
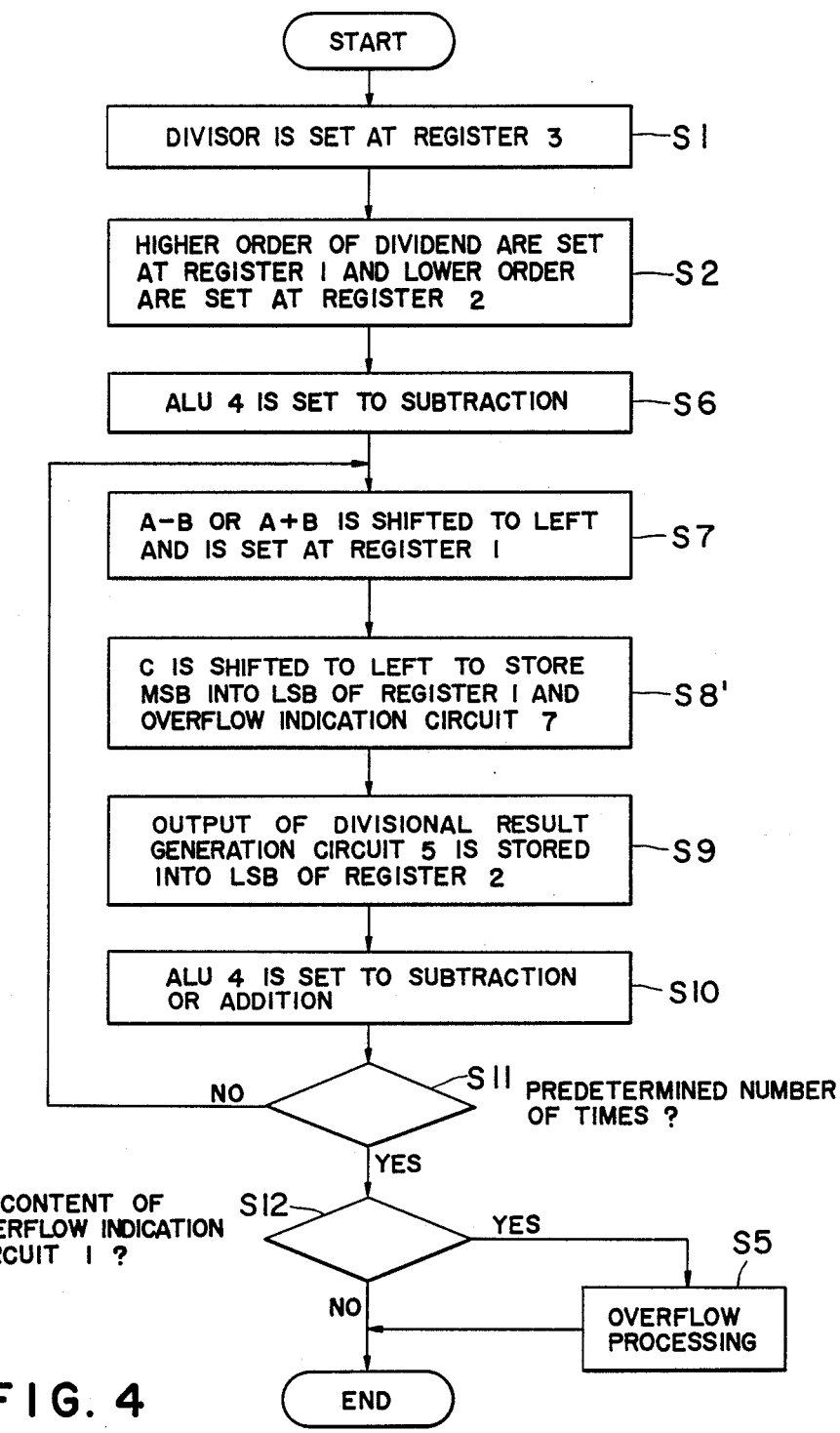
FIG. 4 is a flowchart for explaining the operation of the system shown in FIG. 3.

The procedure of division by this system is shown in the flowchart of FIG. 4. The steps S1 and S2 are completely the same as those in the conventional procedure. However, the divisional procedure starting with the step S6 is initiated without execution of the conventional steps S3 and S4. Namely, the divisional procedure is caused to proceed without confirming whether or not the division overflows. The repetitive procedures for obtaining quotient from the step S6 up to the step S11 are nearly equal to the corresponding conventional procedures It is to be noted that, in the procedure for shifting the data C, as shown in step S8', the most significant bit of the data C is stored into the least significant bit of the first register 1 and is also held by the overflow indication circuit 7.

When a predetermined number of repetitions are completed in this way, the content of the overflow indication circuit 7 is checked at step S12. The flag of 1 bit held in the overflow indication circuit 7 is a flag indicating whether or not the first operation result at the ALU 4 is originally negative. Namely, this flag corresponds to 1 bit which has been outputted from the divisional result generation circuit 5 when the first operation by the ALU 4 is completed and shifted eventually up to the overflow indication circuit 7 by a predetermined number of shift operations at the second register 2. Accordingly, when it is judged that this flag is "1", it can be said that the first operation result by the ALU 4 has not been negative, viz., $A \geq B$ has held at the first time. In such a case, since the data C eventually obtained at the second register 2 is not a correct value as a quotient, overflow processing is executed at step S5. On the contrary, when the flag in the overflow indication circuit 7 represents "0", it can be said that a correct quotient has been obtained as the data C.

As previously described, for the operation in the conventional divisional operation system, the judgment or decision procedure for overflow at the steps S3 and S4 must be carried out prior to the divisional procedure. In contrast, with the divisional operation system according to this invention, it is sufficient only to confirm the flag in the overflow indication circuit 7 at step S12 after the divisional procedure is completed. For this reason, an extra or excessive operation may be saved, resulting in a reduced operation time.

As described above, the divisional operation system according to this invention is constructed to judge whether or not an overflow presents by data of 1 bit lastly shifted from the register at which quotient can be eventually obtained, thus making it possible to save extra or excessive operation, resulting in an improvement in the operation speed.

In addition, this invention is applicable to a divisional operation system constructed as a further embodiment wherein an ALU 4 having an only subtraction function is used whereby only when an operation result of the ALU is zero or positive, the operation result is shifted to the left by one bit to store it into the first register 1, while when negative, the content of the first register is shifted to the left by one bit.

What is claimed is:

1. A divisional operation system for obtaining a quotient by repeating subtraction and shift operations, comprising:
    a first register for storing higher order digits or figures of a dividend;
    a second register for storing lower order digits or figures of said dividend;
    a third register for storing a divisor;
    an arithmetic and logic unit for performing subtraction between the contents of said first register and the contents of said third register or addition of both of the contents;
    a divisional result generation circuit indicating that the operation result of said arithmetic and logic unit is negative or positive;
    said divisional result generation circuit outputting a "0" or a "1" to the least significant bit of the second register, after said arithmetic and logic unit has completed one operation, according to whether the operation result indicates a negative state or a positive state, so as to store the operation result in said first register and shift the contents of said first and second registers to the respective upper digits by one bit, shifting the most significant bit of the second register to the least significant bit of the first register, thereby to repeatedly perform operations the number of times necessary until the quotient is obtained at said second register;
    an arithmetic and logic unit function select circuit for allowing said arithmetic and logic unit to perform addition only when said divisional result generation circuit outputs a "0"; and
    an overflow indication circuit for holding a bit shifted from the most significant bit of said second register after the necessary number of operations have been completed to indicate that the division is in an overflow state when the last-mentioned bit represents a "1".

2. A divisional operation system as set forth in claim 1, wherein said first to third registers each have the same bit capacity.

3. A divisional operation system, comprising:
    a first register for storing higher order digits or figures of a dividend,
    a second register for storing lower order digits or figures of said dividend,
    a third register for storing a divisor,
    an arithmetic and logic unit for performing subtraction between the contents of said first register and the contents of said third register, and a divisional result generation circuit indicating that the operation result of said arithmetic and logic unit is negative or positive;
    said divisional result generation circuit outputting a "0" or a "1" to the least significant bit of the second register, after said arithmetic and logic unit has completed one operation, only when said divisional result generation circuit outputs a "1", so as to store the operation result into said first register and shift the contents of said first and second registers to the respective upper digits by one bit, shifting the most significant bit of the second register into the least significant bit of the first register, thereby to repeatedly perform operations a necessary number of times until the quotient is obtained at said second register; and
    an overflow indication circuit for holding a bit shifted from the most significant bit of said second register after the necessary number of operations have been completed to indicate that the division is in an overflow state when the last-mentioned bit represents "1".

4. A divisional operation system as set forth in claim 3, wherein said first to third registers each have the same bit capacity.

* * * * *